United States Patent [19]

Khan et al.

[11] Patent Number: 5,271,098
[45] Date of Patent: Dec. 14, 1993

[54] METHOD AND APPARATUS FOR USE OF EXPANDED MEMORY SYSTEM (EMS) TO ACCESS CARTRIDGE MEMORY

[75] Inventors: Rashid N. Khan, Cupertino; Stuart Auvinen, Santa Cruz; Funkai Liu, Sunnyvale, all of Calif.

[73] Assignee: Chips and Technologies, Inc., San Jose, Calif.

[21] Appl. No.: 432,681

[22] Filed: Nov. 7, 1989

[51] Int. Cl.$^5$ ............................................. G06F 12/02
[52] U.S. Cl. ........................... 395/400; 364/DIG. 1; 364/245; 364/245.1; 364/246; 364/246.3
[58] Field of Search ... 364/200 MS File, 900 MS File, 364/DIG. 1, DIG. 2; 395/400, 425; 365/230.03, 238.5

[56] References Cited

U.S. PATENT DOCUMENTS

| | | | |
|---|---|---|---|
| 4,156,928 | 5/1979 | Inose et al. | 273/237 |
| 4,177,462 | 12/1979 | Chung | 340/703 |
| 4,296,476 | 10/1981 | Mayer et al. | 395/275 |
| 4,471,465 | 9/1984 | Mayer et al. | 395/275 |
| 4,571,676 | 2/1986 | Mantellina et al. | 364/200 |
| 4,686,525 | 8/1987 | Nagata | 340/790 |
| 4,744,025 | 5/1988 | Lipcon et al. | 364/200 |
| 4,754,271 | 6/1988 | Edwards | 340/784 |
| 4,761,736 | 8/1988 | Di Orio | 364/200 |
| 4,799,635 | 1/1989 | Nakagawa | 395/425 |
| 4,868,780 | 9/1989 | Stern | 395/275 |
| 4,926,322 | 3/1990 | Stimac et al. | 364/200 |
| 4,943,910 | 7/1990 | Nakamura | 364/200 |
| 4,951,248 | 8/1990 | Lynch | 364/900 |
| 5,042,003 | 8/1991 | Belt et al. | 395/425 |
| 5,123,098 | 6/1992 | Gunning et al. | 395/400 |

OTHER PUBLICATIONS

"The Computer Cookbook", W. Bates, Quantum Press/Doubleday, 1984.
"Compatibility And Color Are Key To New Products", Personal Computing, Oct. 1984.
"Faceoff: The Apple IIC vs IBM's New PCjr", P. Costa & J. Bernard, Computers & Electronics, vol. 22, Nov. 1984.
"Method of Expanding the Available Memory Space in Writeable Computer Cartridges", IBM Technical Disclosure Bulletin, vol. 29, No. 2, Jul. 1986.
"Commodore 64", Stan Wszola, Hardware Review, Byte Publications Inc., Jul. 1983.
"Graphics software colors Mindset computer", M. Stenzler-Centonze, Mini-Micro Systems, Jul. 1984.
"Chips and Technologies Announces New Family of Laptop CHIPSets", Chips News Release, San Jose, Calif., Sep. 26, 1988.
"External ROM Sockets", Reviewed by G. Bains, BEEBUG, Dec. 1984, vol. 3, Issue 7.
"RML Gets Serious With The Nimbus", Reviewed by Meredith, Micro Decision, May, 1985.
"A Pretty Penny For Portability", Reviewed by Newman, Micro Decision, Jan. 1985.
"IBM's New Computer", Frenzel, Computer Corner, Radio-Electronics, Mar. 1984.

*Primary Examiner*—Joseph L. Dixon
*Assistant Examiner*—Rebecca L. Rudolph
*Attorney, Agent, or Firm*—Townsend and Townsend Khourie and Crew

[57] ABSTRACT

A method and apparatus which puts a cartridge memory, such as a cartridge ROM, into the EMS memory space. A register value is set to indicate that the cartridge memory is present. This value is provided to enable a logic circuit which does the address transformation needed for EMS and generates a chip select signal for the cartridge memory. The chip select signal is produced upon the detection of an address directed to the cartridge memory. A register stores the address of the cartridge memory. Since the memory address of the cartridge memory can be varied, the location of the cartridge can be placed where it is most convenient for the particular memory structure of a system.

13 Claims, 2 Drawing Sheets

METHOD AND APPARATUS FOR USE OF EXPANDED MEMORY SYSTEM (EMS) TO ACCESS CARTRIDGE MEMORY

BACKGROUND

The present invention relates to expanded memory system (EMS) architectures.

An EMS system is used to increase the memory addressability beyond the logical addressability of a microprocessor. Certain portions of the address space are designated as the EMS "window". An EMS access is triggered by an address which has higher order bits indicating that it is within the EMS window. This is determined by comparing certain of the address bits to a stored register value indicating the portion of memory designated as the EMS window. Upon a match, certain of the higher order address bits are translated to give the actual physical address to be used. A diagram of such an EMS system is shown in FIG. 1, where two different blocks in the EMS window of the one megabyte memory space are mapped to different physical areas of memory in the two megabyte physical memory.

In the typical EMS system, the physical memory is DRAM (dynamic random access memory). Separate portions of memory are reserved for the ROM (read only memory) used to store the microcode or other fixed portions of the system.

SUMMARY OF THE INVENTION

The present invention is a method and apparatus which puts a cartridge memory, such as a cartridge ROM, into the EMS memory space. A register value is set to indicate that the cartridge memory is present. This value is provided to enable a logic circuit which does the address transformation needed for EMS and generates a chip select signal for the cartridge memory. The chip select signal is produced upon the detection of an address directed to the cartridge memory. A register stores the address of the cartridge memory. Since the memory address of the cartridge memory can be varied, the location of the cartridge can be placed where it is most convenient for the particular memory structure of a system.

Two sets of translation address registers are provided, one being used for cartridge memory translations and the other being used for normal EMS translations. This allows a program to use both the normal EMS translation and the cartridge memory, without requiring reloading of the translation address registers.

For a further understanding of the nature and advantages of the invention, reference should be made to the ensuing detailed description taken in conjunction with the accompanying drawings.

DETAILED DESCRIPTION OF THE PREFERRED EMBODIMENT

Figure 1:
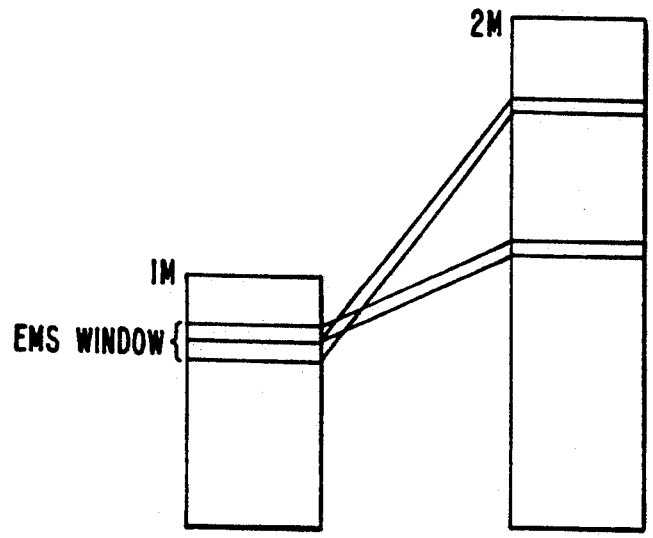
FIG. 1 is a diagram of a prior art EMS mapping example.
Figure 2:
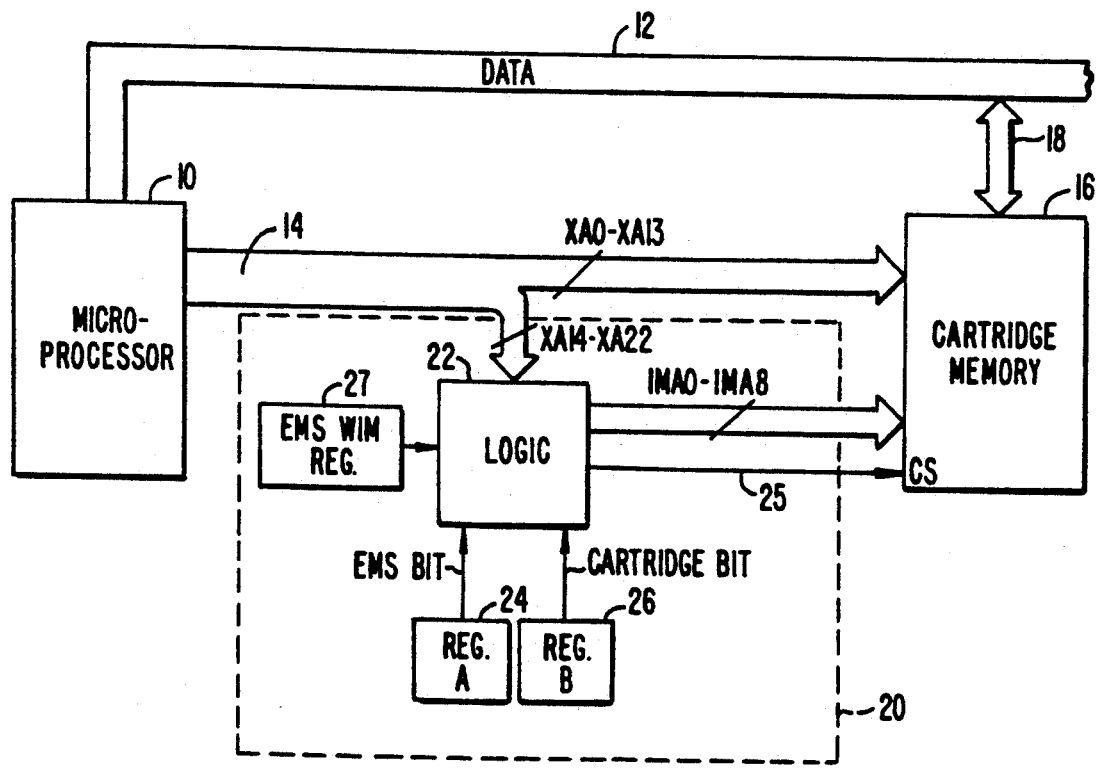
FIG. 2 is a diagram of an EMS system with cartridge memory according to the present invention.

FIG. 2 shows a microprocessor 10 with a data bus 12 and an address bus 14. A cartridge memory 16 is shown with data I/O lines 18 coupling it to data bus 12.

A memory chip 20 according to the present invention (shown in phantom) includes a logic circuit 22 and two registers 24 and 26. Register 24 includes a bit indicating that EMS is activated, while register 26 includes a bit indicating that a cartridge memory is present. These bit values are provided as inputs to logic circuit 22.

Logic circuit 22, when enabled by registers 24 and 26, will transform higher order memory addresses XA14–XA22 from microprocessor 10 into addresses IMA0–IMA8 provided to cartridge memory 16. In addition, logic circuit 22, upon recognizing that address bits XA14–XA22 correspond to the EMS window location for the cartridge memory, will generate a chip select signal on a chip select line 25 to cartridge memory 16.

An EMS window register 27 stores the value of the EMS window for the cartridge memory. This value is compared to the address bits on lines XA14–XA22 by logic circuit 22. As can be seen, the value in register 26 can be changed for different memory systems to place the cartridge memory in the most desirable location. Different memory systems may base their BIOS (basic input/output system) software and other software in different positions in the memory space, thus leaving different areas of the memory space available for placement of a cartridge memory.

The present invention allows a cartridge ROM to be placed in an area normally used for EMS DRAM. The position can be dynamically altered according to the configuration of the particular system.

As can be seen from FIG. 2, the address provided the cartridge memory 16 is a combination of the lower order bits XA0–XA13 directly from microprocessor 10 without change and higher order bits transformed to bits IMA0–IMA8. By arranging the EMS window to begin on a 16K boundary, the lower order bits do not need to be transformed.

Figure 3:
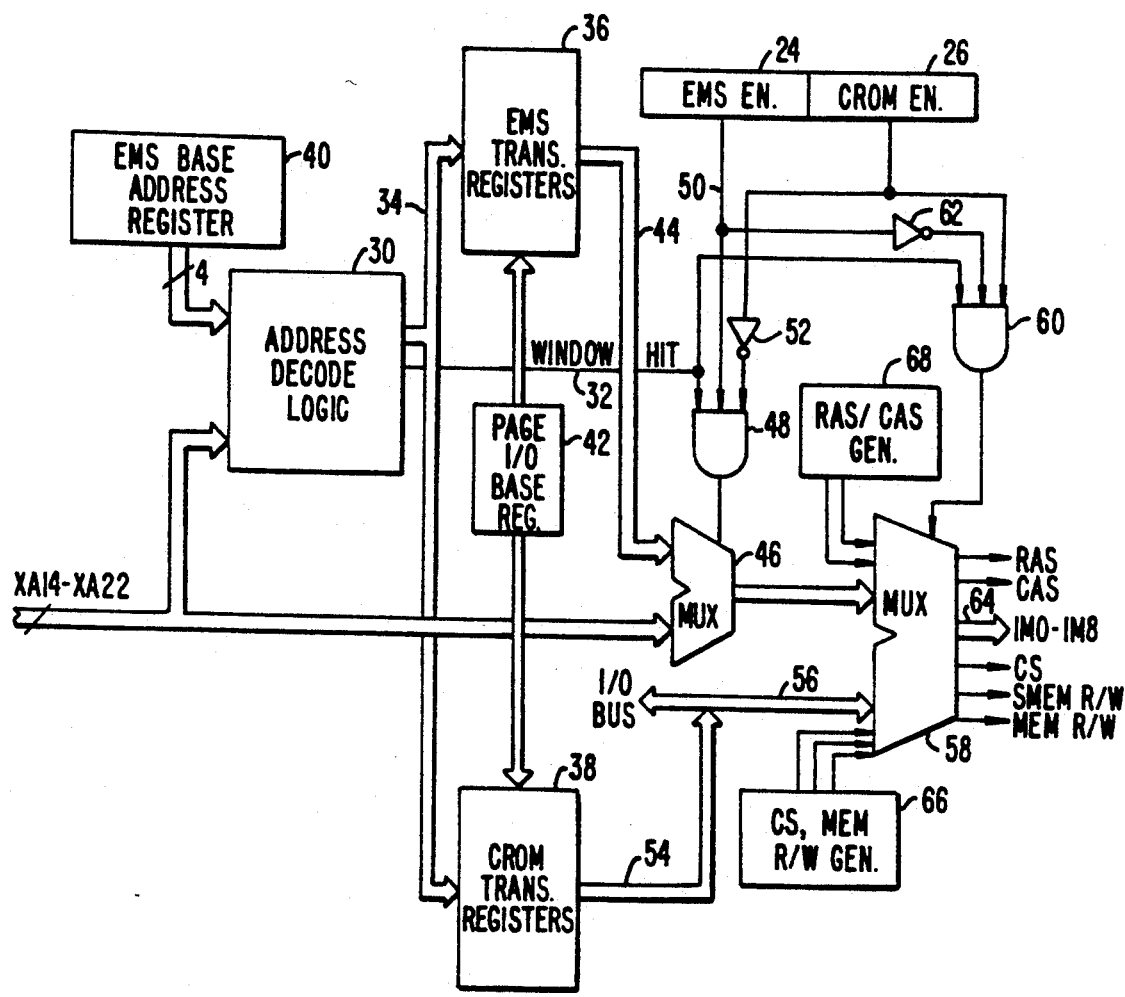
FIG. 3 is a block diagram showing the details of logic circuit 22 of FIG. 2 in more detail.

FIG. 3 shows the logic of FIG. 2 in more detail. Address bits XA14–XA22 are provided to address decode logic circuit 30. Logic 30 compares the received address to the EMS window and produces a window hit signal on a line 32 if the address is within the window. In addition, logic circuit 30 determines which page in the window is being addressed, and provides a select signal for that page on output lines 34 to EMS translation registers 36 and CROM translation registers 38.

The particular window to be used for EMS is determined by four bits in an EMS base address register 40. Register 40 is user programmable to enable the user to select the desired location of the EMS window. Several sets of EMS translation registers are provided to enable the user to select the location of these registers in I/O memory space. The I/O memory location of these registers is set with page I/O base register 42, which is user programmable. Similarly, register 42 determines the I/O address of the CROM translation registers 38.

For an EMS address, the output of registers 36 is provided on a bus 44 and will be used in place of address bits XA14–XA22 through multiplexer 46. Multiplexer 46 is enabled by the window hit line 32 through an AND gate 48. In addition, AND gate 48 must be enabled by having the EMS enable bit in register 24 set and provided on an input 50. In addition, AND gate 48 must have the CROM enable bit in register 26 not enabled (and inverted by inverter 52 to provide a true signal). Thus, the EMS translation address stored in EMS translation registers 36 will be used only if there is a window hit, the EMS option is enabled, and the CROM option is not enabled.

For a CROM access, the translation address bits are provided on a bus 54 to chip I/O bus 56. This bus is provided to multiplexer 58, with the other input being the output of multiplexer 46. For a CROM access, the signal through inverter 52 will disable AND gate 48. At the same time, it will enable an AND gate 60. AND gate 60 receives the window hit signal on line 32 as well as the EMS enable signal, as inverted by inverter 62. The output of AND gate 60 is provided to multiplexer 58 and will select the I/O bus 56 when there is a window hit, EMS is not enabled, and CROM is enabled. This will provide the output translation addresses from translation registers 38 to bus 64 as address signals IM-0-IM8. This select signal from multiplexer 58 also selects the chip select and memory read/write signal produced by chip select memory read/write generator 66. When a normal EMS or normal address is selected by MUX 58, the output of MUX 46 is provided to bus 64 and the RAS and CAS signals from RAS/CAS generator 68 are provided at the output of multiplexer 58.

Figure 4:
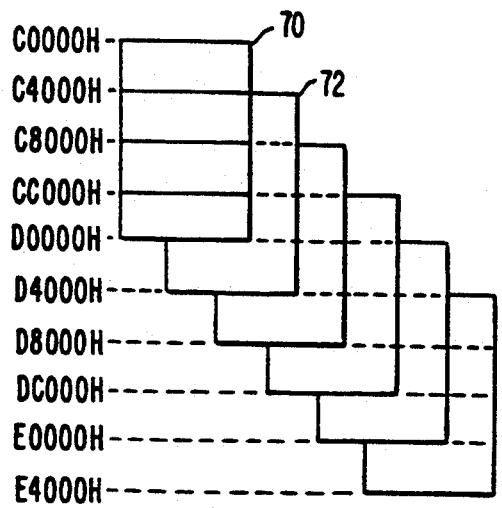
FIG. 4 is a diagram illustrating the 16K overlap of the window options for the EMS window.

The system of the present invention is preferably used with a 64K window area, with each individual window being able to start on one of 9 different 16K boundaries within the 64K window, as illustrated in FIG. 4. FIG. 4 shows a portion of the possible EMS windows. A first possible EMS window 70 starts at address C0000H and ends at address D0000H. The four pages within the window are also shown. A second possible window 72 begins at a 16K offset at address C4000H. Similarly, the remaining windows are offset by 16K, allowing the user precision to the page level in selecting the EMS window. The particular EMS window desired is selected according to 4 bits in EMS base register 40 of FIG. 3. The value of these bits and the corresponding page starting addresses to which they apply are set forth in Table I below.

TABLE I

| | |
|---|---|
| 0000 = | C0000H, C4000H, C8000H, CC000H |
| 0001 = | C4000H, C8000H, CC000H, D0000H |
| 0010 = | C8000H, CC000H, D0000H, D4000H |
| 0011 = | CC000H, D0000H, D4000H, D8000H |
| 0100 = | D0000H, D4000H, C8000H, DC000H |
| 0101 = | D4000H, D8000H, DC000H, E0000H |
| 0110 = | D8000H, DC000H, E0000H, E4000H |
| 0111 = | DC000H, E0000H, E4000H, E8000H |
| 1000 = | E0000H, E4000H, E8000H, EC000H |

Address decode logic 30 of FIG. 3 has stored the particular values of Table I, with the appropriate values being activated by the input bits form register 40.

The I/O address of translation registers 36 or 38 for each of the pages will be one of the following (with 2 registers required to store each translation):

| | |
|---|---|
| Page 0 | 02X8H, 02X9H |
| Page 1 | 42X8H, 42X9H |
| Page 2 | 82X8H, 82X9H |
| Page 3 | C2X8H, C2X9H |

Two values are given for each page since the translation address, in this embodiment, requires two registers. The X portion of the address gives the user flexibility in deciding exactly where to put the registers in I/O address space. The user programs this through register 42 of FIG. 3 with 4 bits providing one of eight possible combinations as shown below:

| | |
|---|---|
| 0000 | X = 0 |
| 0001 | X = 1 |
| 0101 | X = 5 |
| 0110 | X = 6 |
| 1010 | X = A |
| 1011 | X = B |
| 1110 | X = E |

The present invention also provides the ability to coexist with an external EMS mapping circuit. For example, as can be seen in FIG. 4, the external mapping circuit could be allocated C0000H through D0000H while the internal CROM mapping uses D4000H through E4000H.

As will be understood by those familiar with art, the present invention may be embodied in other specific forms without departing from the spirit or essential characteristics thereof. For example, the cartridge memory may be a ROM or a RAM memory which requires a chip select. Accordingly, the disclosure of the preferred embodiment of the invention is intended to be illustrative, but not limiting, of the scope of the invention which is set forth in the following claims.

What is claimed is:

1. A system for accessing a cartridge memory, which can be removed and inserted multiple times by an end user, comprising:
   a cartridge memory having address and data I/O lines and a chip select line;
   means for detecting an input address within a predetermined window of addresses and producing a window hit signal;
   means, coupled to said means for detecting, for providing a translated expanded memory system (EMS) cartridge memory address;
   cartridge logic means for generating a chip select signal; and
   means for providing said translated EMS cartridge memory address and said chip select signal to said cartridge memory in response to said window hit signal.

2. The system of claim 1 wherein said cartridge memory is a read only memory (ROM).

3. The system of claim 1 further comprising:
   means for providing a standard translated EMS address; and
   means for providing said standard translated EMS addresses to outputs of said system.

4. The system of claim 3 wherein said means for providing said translated EMS cartridge memory address and said means for providing said standard translated EMS address include first and second sets of translation address registers, and further comprising means for selectively programming the addresses of said first and second sets of registers.

5. The system of claim 1 wherein said means for detecting includes means for detecting which of a plurality of pages in said window is addressed, said means for providing a translated EMS cartridge memory address including means for providing a different translated address for each of said pages.

6. The system of claim 1 further comprising register means for programming an address location of said window.

7. The system of claim 6 wherein said register means can be programmed to select one of a plurality of overlapping windows.

8. A system for accessing a cartridge memory, which can be removed and inserted multiple times by an end user, comprising:
- a cartridge read only memory (ROM) having address and data I/O liens and a chip select line;
- means for detecting an input address within a predetermined window of addresses and producing at least one window hit signal;
- register means for programming an address location of said window;
- means, coupled to said means for detecting, for providing a translated expanded memory system (EMS) cartridge memory address;
- cartridge logic means for generating a chip select signal;
- means for providing at least one translated EMS cartridge memory address in response to said at least one window hit signal;
- means for providing a different translated standard EMS address in response to said at least one window hit signal; and
- multiplexing means for selectively providing one of said first and second translated EMS addresses to an output of said system.

9. The system of claim 8 wherein said first and second means for providing are first and second sets of registers, and further comprising means for selectively programming the addresses of said first and second sets of registers.

10. The system of claim 8 wherein said register means can be programmed to select one of a plurality of overlapping windows.

11. A system for accessing a cartridge memory, which can be removed and inserted multiple times by an end user, comprising:
- a cartridge memory socket having address and data I/O lines and a chip select line;
- means for detecting an input address within at least one predetermined window of addresses and producing a window hit signal;
- means, coupled to said means for detecting, for providing a translated expanded memory system (EMS) cartridge memory address;
- cartridge logic means for generating a chip select signal;
- means, coupled to said means for detecting, for providing a different translated standard EMS address; and
- means for providing one or both of said translated EMS cartridge memory address and said translated standard EMS address to outputs of said system.

12. The system of claim 11 wherein said means for detecting includes mean for detecting which of a plurality of pages in said window is addressed.

13. The system of claim 12 wherein said means for providing a different translated standard EMS address provides a different address for each of said pages.

* * * * *